(12) United States Patent
Yoshiga et al.

(10) Patent No.: US 10,824,024 B2
(45) Date of Patent: Nov. 3, 2020

(54) ELECTRONIC APPARATUS

(71) Applicant: Innolux Corporation, Miao-Li County (TW)

(72) Inventors: Masahiro Yoshiga, Miao-Li County (TW); Chi-Liang Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 212 days.

(21) Appl. No.: 16/109,813

(22) Filed: Aug. 23, 2018

(65) Prior Publication Data

US 2020/0064675 A1 Feb. 27, 2020

(51) Int. Cl.
| | |
|---|---|
| *G02F 1/1339* | (2006.01) |
| *G02F 1/1335* | (2006.01) |
| *G02F 1/1343* | (2006.01) |
| *G02F 1/1337* | (2006.01) |

(52) U.S. Cl.
CPC .... *G02F 1/13394* (2013.01); *G02F 1/133504* (2013.01); *G02F 1/133512* (2013.01); *G02F 1/133514* (2013.01); *G02F 1/134309* (2013.01); *G02F 1/13439* (2013.01); *G02F 2001/13396* (2013.01); *G02F 2001/133742* (2013.01); *G02F 2201/123* (2013.01); *G02F 2203/30* (2013.01)

(58) Field of Classification Search
CPC ........... G02F 1/13394; G02F 1/133504; G02F 1/133512; G02F 1/133514; G02F 2001/13396; G02F 1/134309; G02F 1/13439; G02F 2001/133742; G02F 2201/123; G02F 2203/30
USPC ......................................................... 349/106
See application file for complete search history.

(56) References Cited

U.S. PATENT DOCUMENTS

| | | | |
|---|---|---|---|
| 2012/0081640 A1* | 4/2012 | Kim ..................... | G02F 1/13394 349/106 |
| 2015/0029211 A1* | 1/2015 | Weber ..................... | G09G 3/00 345/592 |
| 2017/0285422 A1* | 10/2017 | Aoyama ........... | G02F 1/134336 |

* cited by examiner

*Primary Examiner* — Nathanael R Briggs
*Assistant Examiner* — William D Peterson
(74) *Attorney, Agent, or Firm* — McClure, Qualey & Rodack, LLP

(57) ABSTRACT

An electronic apparatus having a display device including a display panel and a light source. The display panel includes a first substrate and a second substrate disposed oppositely, and a display medium layer disposed therebetween. The light source is disposed adjacent to the display panel. The display panel includes several display units, including a first display unit and a second display unit when light passes through the display medium layer. The second display unit is farther from the light source than the first display unit. It is designed that the second haze value is greater than the first haze value.

20 Claims, 10 Drawing Sheets

ELECTRONIC APPARATUS

BACKGROUND

Technical Field

The disclosure relates in general to an electronic apparatus, and more particularly to an electronic apparatus having a display device with uniform luminous intensity.

Description of the Related Art

Electronic products with display device, such as smart phones, tablets, notebook computers, monitors, and TVs, have become indispensable necessities to modern people no matter in their work, study or entertainment. With a flourishing development of the portable electronic products, the consumers pursue better electronic characteristics such as higher speed of response, longer life span and higher reliability, and more diversified functions of the products. Most important of all, the consumers have higher expects on the display quality in despite of the size of the display device.

Conventionally, it is observed that an edge-lit display apparatus has non-uniform distribution of luminous intensity. Distance between the display units and a light source would influence the distribution of luminous intensity. Thus, there is a need to acquire an electronic apparatus having a display device with uniform luminous intensity.

SUMMARY

The disclosure is directed to an electronic apparatus having a display device with uniform luminous intensity.

According to one embodiment of the present disclosure, an electronic apparatus having a display device is provided, and the display device comprises a display panel and a light source disposed adjacent to the display panel. The display panel comprises a first substrate and a second substrate disposed opposite to the first substrate; a display medium layer disposed between the first substrate and the second substrate, the display medium layer comprising liquid crystal (LC) and polymers; and a plurality of display units, comprising a first display unit having a first haze value and a second display unit having a second haze value, wherein a distance between the second display unit and the light source is greater than a distance between the first display unit and the light source, and the second haze value is larger than the first haze value.

According to another embodiment of the present disclosure, an electronic apparatus having a display device is provided, and the display device comprises a display panel and a light source disposed adjacent to the display panel. The display panel comprises a first substrate and a second substrate disposed opposite to the first substrate; a display medium layer disposed between the first substrate and the second substrate, the display medium layer comprising liquid crystal (LC) and polymers; a plurality of display units, comprising a first display unit and a second display unit; and a plurality of spacers disposed between the first substrate and the second substrate, the plurality of spacers comprising a first spacer disposed correspondingly to the first display unit and a second spacer disposed correspondingly to the second display unit, wherein a first horizontal level of the first spacer is greater than a second horizontal level of the second spacer. Also, a distance between the second display unit and the light source is greater than a distance between the first display unit and the light source.

According to a further embodiment of the present disclosure, an electronic apparatus having a display device is provided, the display device comprises a display panel and a light source disposed adjacent to the display panel. The display panel comprises a first substrate and a second substrate disposed opposite to the first substrate; a display medium layer disposed between the first substrate and the second substrate, the display medium layer comprising liquid crystal (LC) and polymers; and a plurality of display units, comprising a first display unit and a second display unit; wherein a distance between the second display unit and the light source is greater than a distance between the first display unit and the light source, wherein the first display unit has a first lighting area, the second display unit has a second lighting area, and the second lighting area is greater than the first lighting area.

The disclosure will become apparent from the following detailed description of the preferred but non-limiting embodiments. The following description is made with reference to the accompanying drawings.

DETAILED DESCRIPTION

Figure 1A:
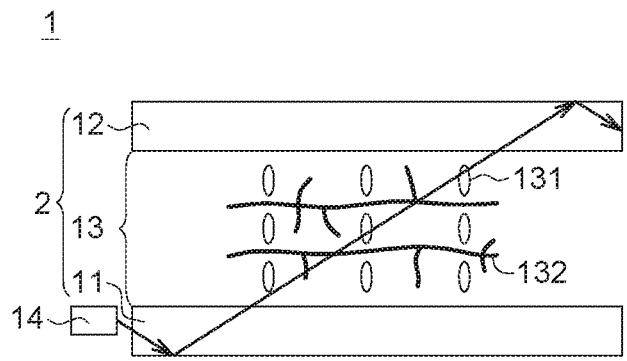
FIG. 1A is a cross-sectional view simply illustrating a display device of an electronic apparatus of an embodiment at a voltage-off state.

In the present disclosure, an electronic apparatus having a display device with uniform luminous intensity is provided. Also, the embodiments of the disclosure can also be applied to different types of electronic apparatus, and an electronic apparatus having a display device is exemplified herein for illustration.

The embodiments are described in details with reference to the accompanying drawings. However, the details of the structures and procedures of the embodiments are provided for exemplification, and the described details of the embodiments are not intended to limit the present disclosure. It is noted that not all embodiments of the disclosure are shown. Combinations of the exemplified embodiments are also applicable. Modifications and variations can be made without departing from the spirit of the disclosure to meet the requirements of the practical applications. Thus, there may be other embodiments of the present disclosure or applications which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense. Also, the identical and/or similar elements of the embodiments are designated with the same and/or similar reference numerals, for clearly illustrating the embodiments.

Moreover, use of ordinal terms such as "first", "second" "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, when a first material layer being formed at, on or above a second material layer have been described in the embodiments, it includes the condition of the first material layer contacting the second material layer. It also includes conditions of one or more material layers disposed between the first material layer and the second material layer, wherein the first material layer would be not directly contact the second material layer, Additionally, the terms for describing connection, such as "connect", "connect to each other", etc., can be referred to two structures in direct contact or in non-direct contact (i.e. other structure disposed therebetween), unless specially defined. Also, the terms of "adjacent" or "adjacently" can be referred to two elements positioned adjacently at the same horizontal level or at the different horizontal levels (e.g. the two elements are disposed respectively in the higher and lower positions). The terms "about", "approximate", and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially". For example, the terms of "same" or "equal" may be referred to the difference between two elements are in a range of 10% because of the engineering tolerance or the deviation.

Figure 1B:
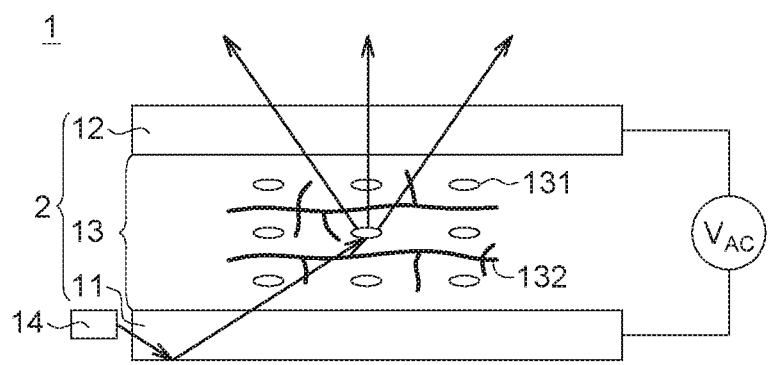
FIG. 1B is a cross-sectional view simply illustrating the display device of an embodiment at a voltage-on state.

FIG. 1A is a cross-sectional view simply illustrating a display device of an electronic apparatus of an embodiment at a voltage-off state. FIG. 1B is a cross-sectional view simply illustrating the display device of an embodiment at a voltage-on state. In an exemplary embodiment, a display device 1 of an electronic apparatus comprises a display panel 2 and a light source 14. The display panel 2 comprises a first substrate 11, a second substrate 12 disposed opposite to the first substrate 11, and a display medium layer 13 disposed between the first substrate 11 and the second substrate 12. The light source 14 may be disposed adjacent to of the display panel 2, as shown in FIG. 1A. The display device may comprise a plurality of pixel regions defined by data lines (not shown) and scan lines (not shown) as known in the art, and details are not redundantly described herein. In some examples, the electronic apparatus may be a refrigerator, a wearable device, a vehicle, a sensor, a public information displaying device, or other suitable devices. In other examples, the display device may be a transparent display device, or other suitable display device.

According to one embodiment, the display medium layer 13 includes the liquid crystal (LC) 131 and polymers 132. The display medium layer 13 may include a polymer network liquid crystal (PNLC), a polymer dispersed liquid crystal (PDLC), a polymer stabilized liquid crystal (PSLC), a nematic curvilinear aligned phase (N-CAP), a polymer encapsulated liquid crystal (PELC), and etc. The disclosure has no particular limitation thereto. Take PNLC for example, in some embodiments, the polymer network liquid crystal may be formed by preparing a mixture of photocurable polymerizable monomer (including dimer or polymeric precursor) and a liquid crystal composition and curing the polymer using a light such as ultraviolet or inducing phase separation of the liquid crystal and the polymer. The liquid crystal composition may further include a photoinitiator for initiating a polymerization reaction of the polymer. In other embodiments, the polymer may be cured by applying heat to the liquid crystal composition. A network is formed while curing the polymer. When a beam of light passes through the display medium layer 13, the light may be scattered by a difference in refractive index between the liquid crystal and the polymer. Under the condition that an electric field is applied to the display medium layer 13 (i.e. in a voltage-on state), the liquid crystals are arranged in a predetermined direction by the electric field. In an application of a display device having the LC encapsulated by the polymer, the pixels (sub-pixels) are hazy (exhibit optical non-clarity) at a voltage-on state due to light scattering by the encapsulated liquid crystal.

FIG. 1A and FIG. 1B illustrate a display device of the electronic apparatus of an embodiment in one application at a voltage-off state and a voltage-on state, respectively; however, the orientations of LC in FIG. 1A and FIG. 1B are provided for illustrating one type of the LC 131 and the polymer 132, and it may be varied based on the types of the LC and the polymer as used. Initial LC alignment can be vertical or horizontal, and there is no limitation thereto. In one example, vertical alignment as initial LC alignment is exemplified herein. As shown in FIG. 1A, the LC 131 is vertically aligned at a voltage-off state. If a refractive index of the LC 131 is similar to a refractive index of the polymer 132, for example, a ratio of the refractive index of the LC 131 to the refractive index of the polymer 132 is in a range from 0.9 to 1.1, the incident light will pass through both of the LC 131 and the polymer 132; thus, the display device may be transparent (e.g. high transmittance). As shown in FIG. 1B, the alignment of the LC 131 may be changed as a voltage is applied, and the refractive index of the LC 131 is changed and different from the refractive index of the polymer 132, so that the light is scattered (diffused); thus, the light scattering areas of the display device is not transparent anymore and thereby display images. It is noted that the display device may include a plurality of pixel regions, and the pixel regions may be individually controlled.

Since the distance between the pixel regions and the light source 14 of the display device may influence the distribution of luminous intensity (i.e. the light amounts passing through the pixel regions vary with the distances), thereby causing non-uniform distribution of luminous intensity. The disclosure provides several embodiments and some examples for solving this issue.

First Embodiment

In the first embodiment, various values of the haze (haze values) of the display units are provided, thereby achieving uniform distribution of luminous intensity.

Figure 2:
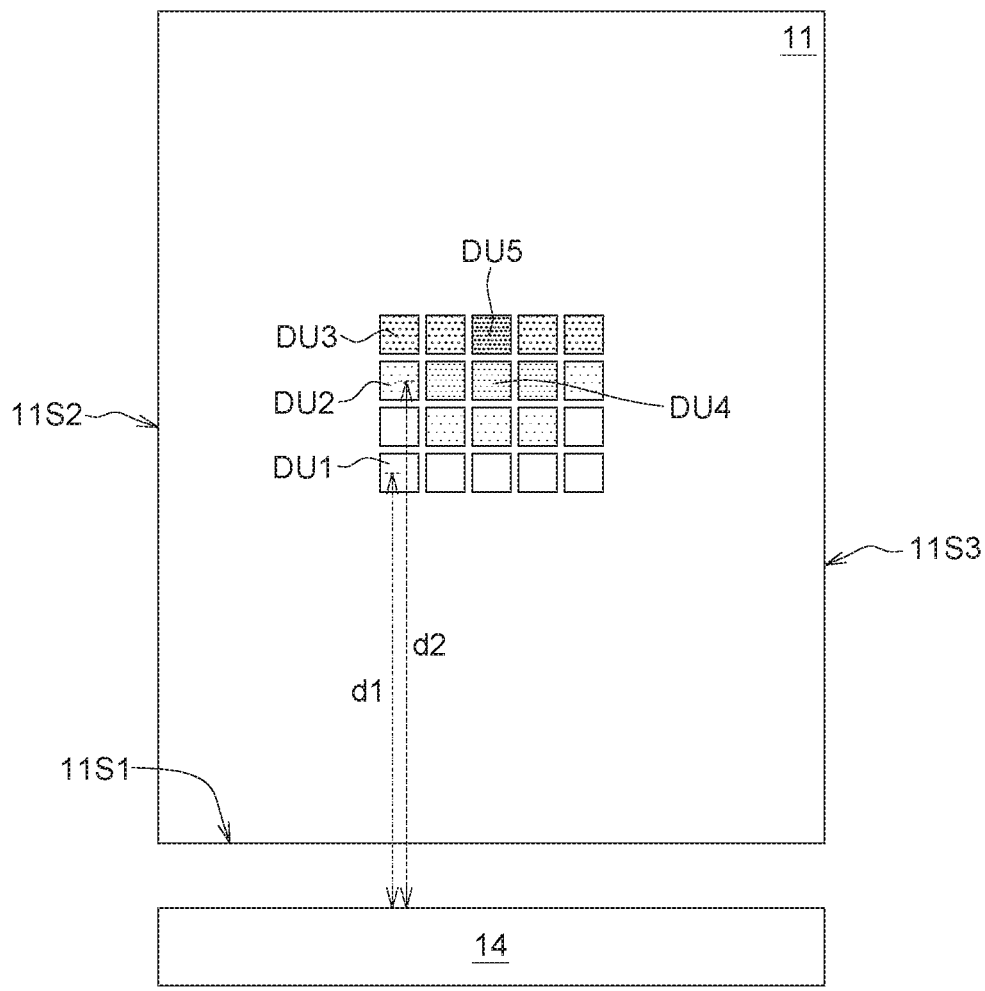
FIG. 2 is a top view illustrating a display device of an electronic apparatus according to one of the first embodiments having varied values of the haze of the display units.

FIG. 2 is a top view illustrating a display device of an electronic apparatus according to one of the first embodiments having varied values of the haze of the display units. According to the embodiment, the display device may comprise a plurality of display units (e.g. the square areas DU1, DU2 . . . as shown in FIG. 2), one of the display units may include one pixel, and one pixel may include a plurality of sub-pixels. In some examples, the display units may include the same number of the pixels/sub-pixels.

In some examples, the haze value can be measured by a haze measurement equipment. For example, the haze may be defined as (Tdif/Tt)×100%, wherein Tdif is the diffusing transmittance of the measured portion of the sample, and Tt is the total transmittance of the measured portion of the sample. The measuring method may be defined by ISO13648-1:1996 or ISO14782-1:1999. The disclosure is not limited thereto. The haze value may be measured by other measuring methods known in the art or defined under international test standards.

According to one embodiment, the display unit farther from the light source has a greater haze value than a closer one, thereby obtaining an uniformly illuminated display device.

Take a first display unit DU1 and a second display unit DU2 shown in FIG. 2 for illustration. In one embodiment, the first display unit DU1 has a first distance d1 from the light source 14, and a second display unit DU2 has a second distance d2 from the light source 14, wherein the second distance d2 is larger than the first distance d1. The haze value of the first display unit DU1 is greater than the haze value of the second display unit DU2, thereby implementing the luminous intensity of the second display unit DU2 approximate to the luminous intensity of the first display unit DU1.

Accordingly, in one embodiment, the first display unit DU1 has a first haze value and the second display unit DU2 has a second haze value when the light from the light source and the ambient light pass through the display medium layer (e.g. at a voltage-on state), the second display unit DU2 may be farther from the light source 14 than the first display unit DU1, and the second haze value is larger than the first haze value according to the embodiment. In some examples, a ratio of the area of the first display unit DU1 to the area of the second display unit DU2 is in a range from 0.9 to 1.1. In one example, if the display device of an electronic apparatus includes several display units having the same area as provided in the first embodiment, the values of the haze of the display units may be increased as the distances of the display units from the light source increase. In one example, the display units further comprises a third display unit DU3 having a third haze value. The third display unit DU3 is farther from the light source 14 than the second display unit DU2, as shown in FIG. 2, and third haze value is greater than the second haze value.

In one example, the display units of the embodiment may comprise another display unit having another haze value, and the position of the another display unit is more central than the second display unit DU2, and the haze value of another display unit is greater than the second haze value of the second display unit DU2. For example, the another display unit and the second display unit DU2 may have the same area. In one example, as shown in FIG. 2, the first substrate 11 comprises two opposite sides 11S2 and 11S3 respectively connected to the one side 11S1. The side 11S1 is disposed adjacent to the light source 14. The fourth display unit DU4 has a fourth haze value. It is assumed that the fourth display unit DU4 and the second display unit DU2 are spaced apart from the light source 14 at the same distance, and the fourth display unit DU4 is closer to the central region of the display device than the second display unit DU2. In some examples, the fourth display unit DU4 and the second display unit DU2 have the same area, and the fourth haze value is greater than the second haze value, thereby increasing the luminous intensity of the fourth display unit DU4.

Similarly, the fifth haze value of the fifth display unit DU5 is greater than the third haze value of the third display unit DU3, thereby increasing the luminous intensity of the fifth display unit DU5. In some examples, the fifth display unit DU5 and the third display unit DU3 may have the same area. Other display units of an embodied display device can be designed based on the illustrations provided above, and the details are not redundantly repeated.

Examples are provided below for illustrating some feasible approaches to implement the greater light scattering ability/efficiency (e.g. haze values) of the display units farther from the light source 14.

EXAMPLE 1-1

Cell Gap Variation

Figure 3A:
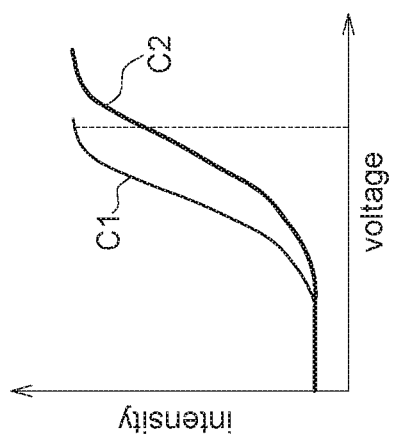
FIG. 3A is the luminous intensity vs. applied voltage plot for the display device with different cell gaps.

FIG. 3A is the luminous intensity vs. applied voltage plot for the display device with different cell gaps. As shown in FIG. 3A, the curve C1 represents the intensity increases with the increased voltage as applied to a display device having a first cell gap, and the curve C2 represents the intensity increases with the increased voltage as applied to a display device having a second cell gap. The first cell gap is less than the second cell gap. It is indicated that the display device having smaller cell gap has higher luminous intensity at the same voltage.

Figure 3B:
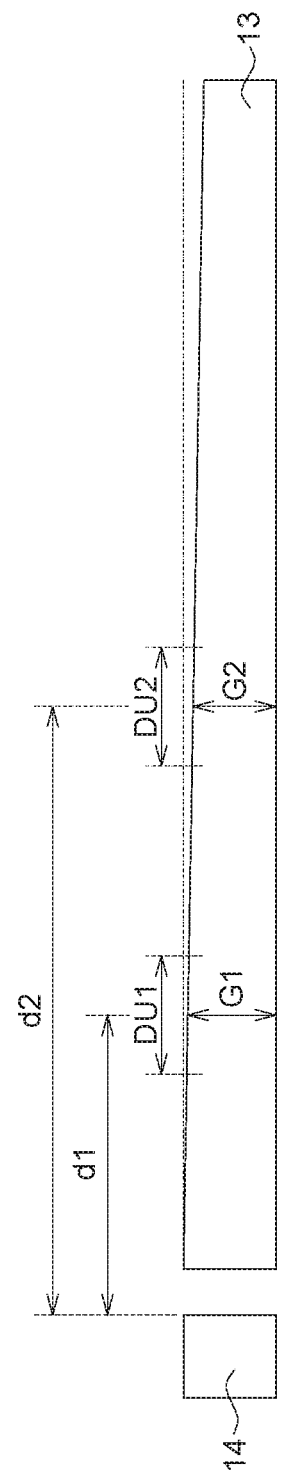
FIG. 3B is a drawing simply illustrating variation of cell gaps of a display device of an electronic apparatus according to one of the examples for the first embodiment of the disclosure.

Therefore, the uniform luminous intensity of the display units spaced apart from the light source by different distances is achieved by varying the cell gaps corresponding to the display units. FIG. 3B is a drawing simply illustrating variation of cell gaps of a display device according to one of the examples for the first embodiment of the disclosure. For clear illustration purpose, the drawings may depict relevant components/elements and omit irrelevant components/elements; for example, FIG. 3B merely depicts the display medium layer 13 and the light source 14 adjacent thereto. Other components/elements, such as the first and second substrates 11/12, and LC 131 and polymer 132 in the display medium layer 13, can be referred to FIG. 1.

Please refer to FIG. 2 and FIG. 3B. In one embodiment, the first display unit DU1 has a first cell gap G1, the second display unit DU2 has a second cell gap G2, and the second cell gap G2 is less than the first cell gap G1, as shown in FIG. 3B. In one example, if a display device comprises display units having the same area, the cell gaps corresponding to the display units decrease (become thinner) when the distances of the display units from the light source increase. In some examples, a second haze value of the second display unit DU2 is greater than a first haze value of the first display unit DU1.

Furthermore, it is noted that the two opposite substrates of a typical display device are separated by a controlled gap or distance, which is maintained by spacers (e.g, photo-spacers). For example, the spacers may be referred to main spacers rather than sub-spacers because the main spacers are configured to control the cell gap. In one example of the embodiment, variation of cell gaps may be achieved by changing the horizontal levels of the spacers. In other example, the variation of cell gaps may be achieved by changing the heights of the spacers. For example, a display device further comprises several photo-spacers disposed between the first substrate 11 and the second substrate 12, wherein the photo-spacers comprises a first spacer PS1 (shown in FIG. 3C and FIG. 3D) disposed correspondingly to the first display unit DU1 and a second photo-spacer PS2 (shown in FIG. 3C and FIG. 3D) disposed correspondingly to the second display unit DU2, wherein a first horizontal level of the first spacer PS1 is higher than a second horizontal level of the second spacer PS2, thereby implementing the second cell gap G2 smaller than the first cell gap G1. It is noted that a horizontal level of a spacer as described herein is related to a distance between a top surface of the spacer and a top surface of the substrate for setting the spacer, may not be an actual height of the spacer. Accordingly, the actual heights of the spacers related to the display units of the embodiment would be changed or not, depending on the positions and/or film thickness for disposing the spacers.

Figure 3C:
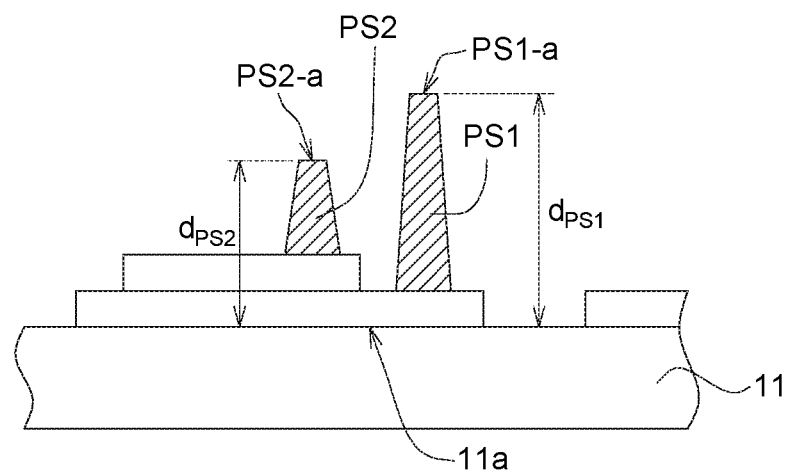
FIG. 3C and FIG. 3D depict two different configurations of the spacers disposed above the substrate.
Figure 3D:
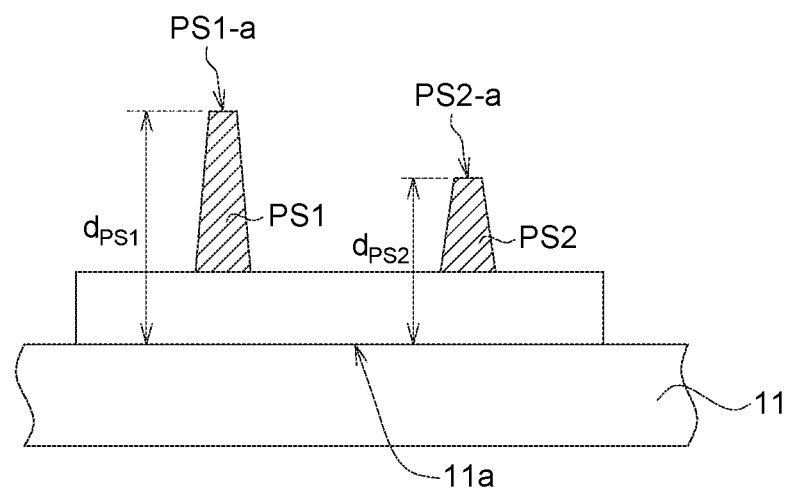

FIG. 3C and FIG. 3D depict two different conditions for disposing spacers on the substrate. As shown in FIG. 3C and FIG. 3D, the first spacer PS1 and the second spacer PS2 in FIG. 3C are formed on different layers on the first substrate 11 while the first spacer PS1 and the second spacer PS2 in FIG. 3D are formed on the same layer on the first substrate 11. The horizontal level of the first spacer PS1 is related to a distance $d_{PS1}$ between a top surface PS1-$a$ of the first spacer PS1 and a top surface 11$a$ of the first substrate 11. The horizontal level of the second spacer PS2 is related to a distance $d_{PS2}$ between a top surface PS2-$a$ of the second spacer PS2 and a top surface 11$a$ of the first substrate 11, may not be the actual heights of the first spacer PS1 and the second spacer PS2.

EXAMPLE 1-2

Variation of Processing Voltages

Figure 4A:
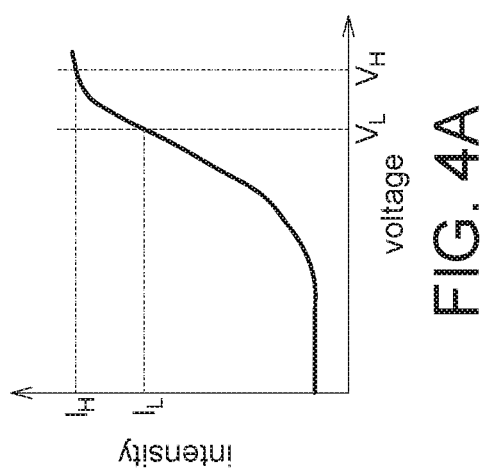
FIG. 4A is the luminous intensity vs. applied voltage plot for a display device of an electronic apparatus.

FIG. 4A is the luminous intensity vs. applied voltage plot for a display device. It is indicated in FIG. 4A that the intensity increases when the applied voltage increases at the same gray level. For example, the intensity $I_H$ at the voltage $V_H$ as applied to the display device is greater than the intensity $I_L$ at the voltage $V_L$, wherein $V_H > V_L$.

Figure 4B:
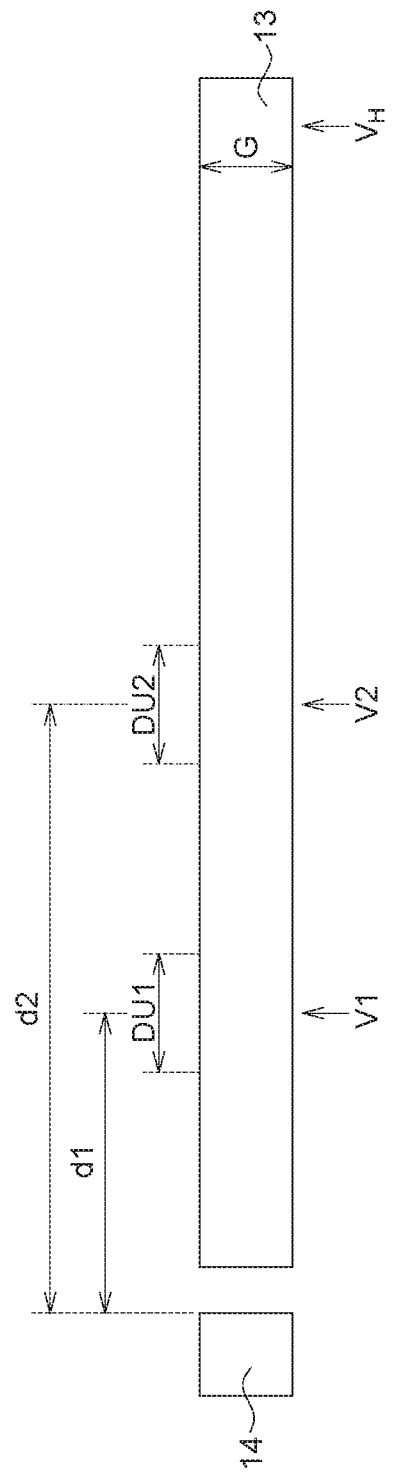
FIG. 4B is a drawing simply illustrating variation of processing voltages for a display device of an electronic apparatus according to another example of the first embodiment of the disclosure.

Therefore, the uniform luminous intensity of the display units spaced apart from the light source by different distances may be achieved by varying the processing voltages applied to the display units. FIG. 4B is a drawing simply illustrating variation of processing voltages for a display device according to another example of the first embodiment of the disclosure. Similarly, for clear illustration purpose, the drawings depict relevant components/elements and omit irrelevant components/elements. For example, FIG. 4B merely depicts the display medium layer 13 (with a uniform cell gap G) and the light source 14 adjacent thereto.

Please refer to FIG. 2 and FIG. 4B. As shown in FIG. 4B, the second display unit DU2 is farther from the light source 14 than the first display unit DU1. In one embodiment, the first display unit DU1 is applied by a first voltage V1 and the second display unit DU2 is applied by a second voltage V2 for achieving the same gray level, wherein the second voltage V2 is greater than the first voltage V1. In one example, if a display device comprises several display units having the same area, the processing voltages corresponding to the display units increase when the distances between the display units and the light source 14 increase.

Second Embodiment

Figure 5:
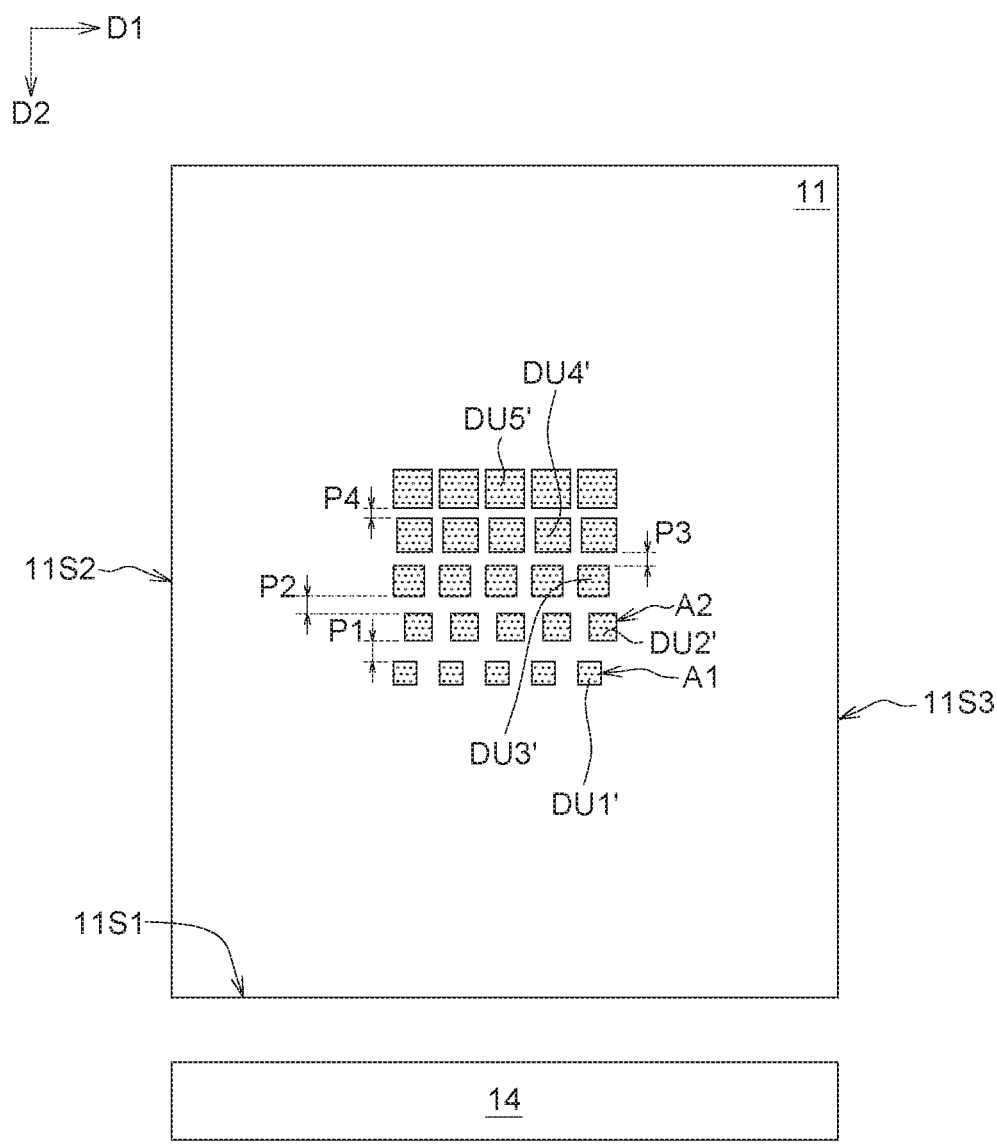
FIG. 5 is a top view illustrating a display device of an electronic apparatus according to one of the second embodiments having varied sizes of the display units.

In the second embodiment, various areas of the display units is provided, thereby achieving uniform distribution of luminous intensity. FIG. 5 is a top view illustrating a display device according to one of the second embodiments having varied sizes of the display units. According to the embodiment, the display device may include several display units, and at least one of the display units may include one or more pixels, or one or more sub-pixels. In one example, the display units may have the similar haze values, and the ratio of the haze values of the two display units may be in a range from 0.9 to 1.1.

According to the second embodiment, it is designed that the display unit farther from the light source has a greater luminous intensity, thereby obtaining a uniformly illuminated display device.

Take a first display unit DU1' and a second display unit DU2' shown in FIG. 5 for illustration. According to an embodiment, the first display unit DU1' has a first lighting area A1 the second display unit DU2' has a second lighting area A2, and the second lighting area A2 is greater than the first lighting area A1. A lighting area as described herein may be defined as an area of scattered light perceived by an observer or an instrument. Since the amount of the light passing through the second display unit DU2' may be less than the first display unit DU1', the larger lighting area of the second display unit DU2' than that of the first display unit DU1' can increase the light scattering amount of the second display unit DU2', thereby obtaining a display device with a large extent of the display region illuminated uniformly.

Additionally, the display units may be arranged into non-staggered rows or staggered rows. For increasing the amount of light reaching the display units farther from the light source 14, the display units in adjacent rows are preferably arranged in a staggered way (i.e. displaced by a certain distance). As shown in FIG. 5, the first substrate 11 having the side 11S1 extending along a first direction D1. A second direction D2 may be perpendicular to the first direction D1. In other examples, the included angle between the first direction D1 and the second direction D2 may be in a range from 80° to 110°. The sides such as 11S2 and 11S3 may extend along the second direction D2. For example, the side 11S1 may be adjacent to the light source 14. The second display unit DU2' and the first display unit DU1 are staggered at a direction (such as the second direction D2). In one example, the display units can be arranged into m rows, and each of the m rows may include p display units having the same lighting area, m and p are positive integers, wherein the display units of a (m−1)-th row and the display units of a m-th row are staggered to each other (along the second direction D2). In FIG. 5, the display units are arranged into 5 rows, each row includes 5 display units (m=5, p=5) for exemplification, wherein the display units in adjacent rows (such as the display units in the first row and the second row, or the display units in the second row and the third row, or the display units in the third row and the fourth row, or the display units in the fourth row and the fifth row) are arranged in a staggered way.

Moreover, spacings between the display units in adjacent rows may be the same, or can be decreased with the distances between the display units of each row from the light source 14. In one example, the display units are arranged into m rows, and the spacings between the display units of the m rows decrease with the distances between the display units from the light source 14. For example, a first spacing P1 between the display units in the first row (e.g. comprising the first display unit DU1') and the second row (e.g. comprising the second display unit DU2') can be equal to or greater than a second spacing P2 between the display units in the second row and the third row (e.g. comprising the third display unit DU3'). As shown in FIG. 5, the first spacing P1 between the display units in the first row and the second row is greater than the second spacing P2 between the display units in the second row and the third row; the second spacing P2 is greater than a third spacing P3 between the display units in the third row and the display units in the fourth row (e.g. comprising the fourth display unit DU4'); and the third spacing P3 is greater than a fourth spacing P4 between the display units in the fourth row and the display units in the fifth row (e.g. comprising the fifth display unit DU5') (P1>P2>P3>P4). In one example, the spacings of the display units of one of the rows may be different. For example, the display units disposed along the first direction D1 are arranged in a staggered way.

Examples are provided below for illustrating some feasible approaches to implement the variations of lighting areas of the display units with distances spaced apart from the light source 14.

EXAMPLE 2-1

Variation of Pixel Electrode

Figure 6:
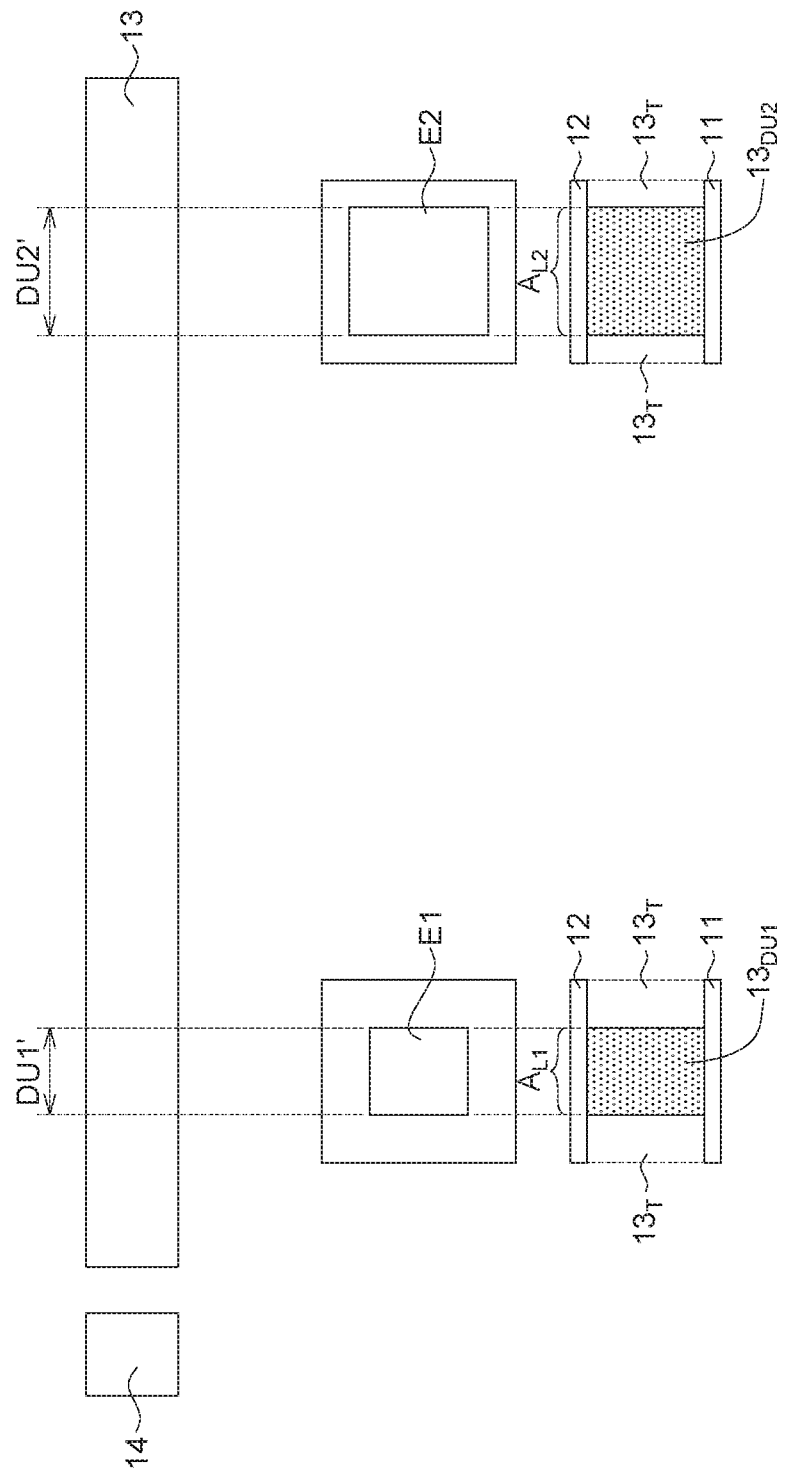
FIG. 6 is a drawing simply illustrating variations of pixel electrodes of a display device of an electronic apparatus according to one of the examples for the second embodiment of the disclosure.

FIG. 6 is a drawing simply illustrating variations of pixel electrodes of a display device according to one of the examples for the second embodiment of the disclosure. For clear illustration purpose, the drawings may depict relevant components/elements (such as the display medium layer, the light source and the effective electrode areas) and omit irrelevant components/elements. Noted that a display device further comprises at least an electrode layer disposed on at least one of the substrates 11/12. One of the feasible approaches to achieve the uniform luminous intensity of the display units by varying the lighting areas of the display units with distances spaced apart from the light source 14 is to change the areas of pixel electrodes.

In one example, the first display unit DU1' and the second display unit DU2' respectively comprise a first electrode portion E1 and a second electrode portion E2 for affecting orientation of the LC when a voltage is applied, wherein an area of the first electrode portion E1 is less than an area of the second electrode portion E2, as shown in FIG. 6. Also, in the first display unit DU1', a portion $13_{DU1}$ of the display medium layer 13 between the first substrate 11 and the second substrate 12 is related to the first electrode portion E1 and scatters light when the display device is at a voltage-on state, which produces the lighting area $A_{L1}$ correspondingly. Other portion $13_T$ of the display medium layer 13 that is not overlapped with the region of the first electrode portion E1 may not scatter the light when the display device is at a voltage-on state. Accordingly, the area of the first electrode portion E1 is less than the area of the second electrode portion E2, so that the lighting area $A_{L2}$ of the second display unit DU2' is greater than the lighting area $A_{L1}$ of the first display unit DU1' ($A_{L2}>A_{L1}$). In other words, the area of the first electrode portion E1 and the area of the second electrode portion E2 may be referred as effective electrode areas for driving the liquid crystals of the display medium layer in the first display unit DU1' and the second display unit DU2', respectively.

Figure 7:
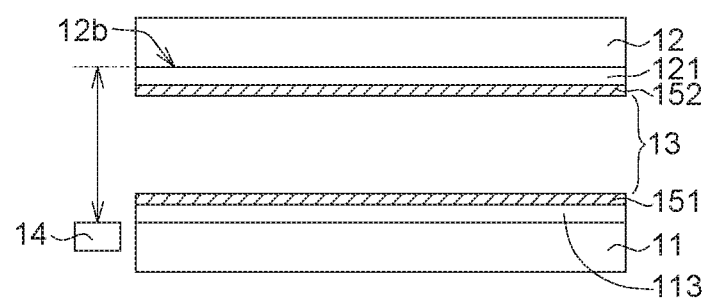
FIG. 7 is a cross-sectional view simply showing a display device of an electronic apparatus with a patterned electrode layer according to one example of the second embodiment.

Many different types of electrodes are applicable in the example. FIG. 7 is a cross-sectional view simply showing a display device with a patterned electrode layer according to one example of the second embodiment. In this example, a display device comprises a first substrate 11, a second substrate 12 disposed opposite to the first substrate 11, a display medium layer 13 disposed between the first substrate 11 and the second substrate 12, a light source 14 disposed adjacent to one side of the first substrate 11 or the display medium layer 13, a first electrode layer 113 disposed on the first substrate 11, and a second electrode layer 121 disposed on the second substrate 12. The first electrode layer 113 and the second electrode layer 121 are used for affecting orientation of the LC when a voltage is applied. In one embodiment, one of the first electrode layer 113 and the second electrode layer 121 is a patterned electrode layer. For example, the first electrode layer 113 is a lower electrode layer and the second electrode layer 121 is an upper electrode layer. In one example, the first electrode layer 113 can be a patterned electrode, and the second electrode layer 121 can be a non-patterned electrode, as shown in FIG. 7. Alternatively, the first electrode layer 113 can be a non-patterned electrode, and the second electrode layer 121 can be a patterned electrode, the disclosure has no particular limitation thereto. Also, the first electrode layer 113 and the second electrode layer 121 can include indium tin oxide (ITO). Please refer to FIG. 6 and FIG. 7, in one example, the first electrode layer 113 may comprise the first electrode portion E1 corresponding to the first display unit DU1' and the second electrode portion E2 corresponding to the second display unit DU2', wherein an area of the first electrode portion E1 is less than an area of the second electrode portion E2.

Moreover, in one example, the display device may further comprise alignment films, such as a first alignment film 151 above the first substrate 11 and a second alignment film 152 above the second substrate 12 as shown in FIG. 7. The disclosure has no particular limitations to applicable types and layers/components of the display device. Also, in one example, the position of the light source 14 may be not higher than a surface 12b of the second substrate 12.

EXAMPLE 2-2

Variation of the Light Shielding Layer Design

Figure 8:
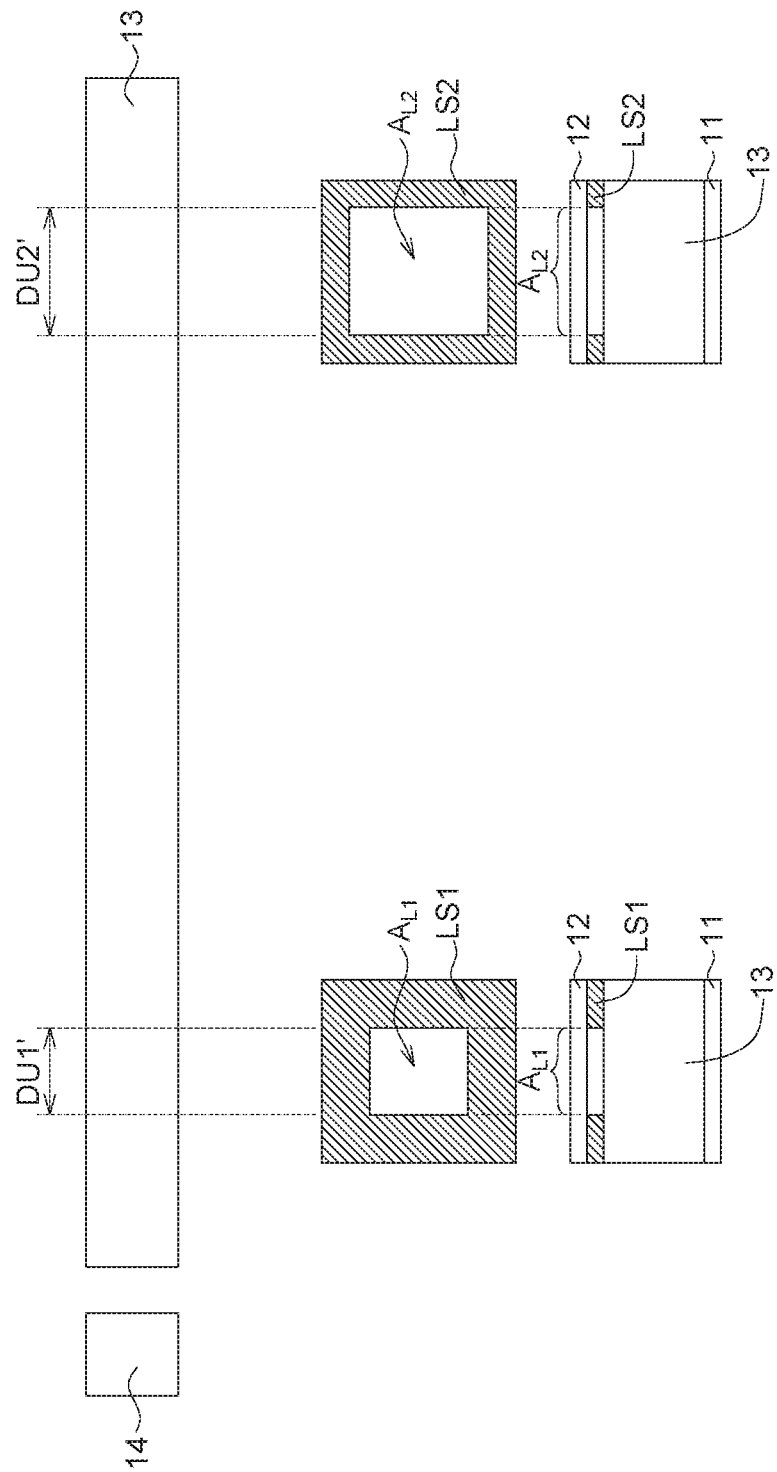
FIG. 8 is a drawing simply illustrating variations of the light shielding layer of a display device of an electronic apparatus according to another example of the second embodiment of the disclosure.

FIG. 8 is a drawing simply illustrating variations of the light shielding layer of a display device according to another example of the second embodiment of the disclosure. Similarly, for clear illustration purpose, the drawings may depict relevant components/elements (such as the display medium layer, the light source and the light shielding layer) and omit irrelevant components/elements. Noted that a display device further comprises a light shielding layer on one of the first substrate 11 and the second substrate 12. One of the feasible approaches to achieve the uniform luminous intensity of the display units by varying the lighting areas of the display units with distances spaced apart from the light source 14 is to change the light shielding layer design corresponding to the display units. In one example, the material of the light shielding layer may include black matrix, or other suitable materials. As shown in FIG. 8, the light shielding layer has an opening area $A_{L1}$ of a first shielding portion LS1 corresponding to the first display unit DU1', and an opening area $A_{L2}$ of a second shielding portion LS2 corresponding to the second display unit DUZ, wherein the opening area $A_{L1}$ of the first shielding portion LS1 is less than the opening area $A_{L1}$ of the second shielding portion LS2. In other words, the opening area $A_{L2}$ of the second display unit DU2' is greater than the opening area $A_{L1}$ of the first display unit DU1' ($A_{L2}>A_{L1}$). Typically, the opening regions may influence the sizes of the lighting areas.

Figure 9:
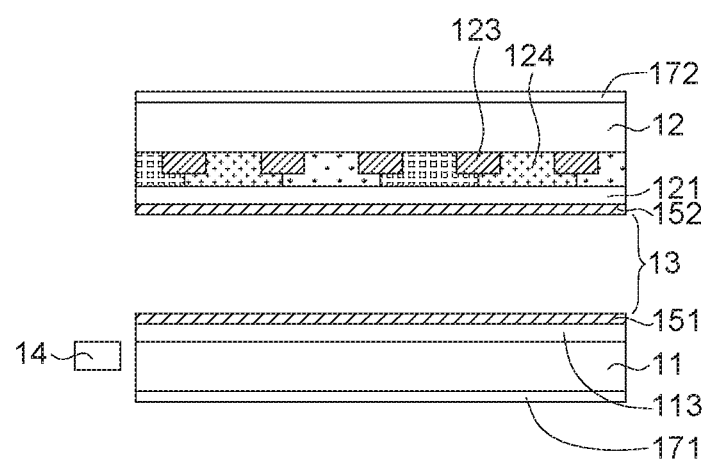
FIG. 9 is a cross-sectional view simply showing another display device of an electronic apparatus with a patterned electrode layer and a light shielding layer according to another example of the second embodiment.

FIG. 9 is a cross-sectional view simply showing another display device with a patterned electrode layer and a light shielding layer according to another example of the second embodiment. As shown in FIG. 9, the display device comprises a first substrate 11, a second substrate 12, a display medium layer 13, a light source 14, a first electrode layer 113 (e.g. a patterned electrode layer) disposed between the first substrate 11 and the second substrate 12, a second electrode layer 121 disposed between the first substrate 11 and the second substrate 12, a first alignment film 151 on the first electrode layer 113, a second alignment film 152 on the second electrode layer 121, and a black matrix layer 123 on the second substrate 12. In some embodiments, the display device may further comprise a color filter layer 124 between the second electrode layer 121 and the second substrate 12. Also, the display device may further comprise a first polarizer 171 and a second polarizer 172 on the first substrate 11 and the second substrate 12, respectively. The display device with a color filter layer may have a strong colored image.

According to the aforementioned descriptions, a display device with uniform luminous intensity. It is noted that the technique features described in the embodiments does not limit the types of the display devices and/or the electronic apparatuses in the applications. Structural details of the aforementioned embodiments are provided for exemplification only, not for limitation. It is, of course, noted that the features of different embodiments can be combined and rearranged without departing from the spirit and scope of the present disclosure. Other embodiments with different configurations, such as change on components of the related layers and the displaying elements to meet practical requirements can be applicable. Accordingly, it is known by people skilled in the art that the configurations and the procedure details of the related components/layers could be adjusted according to the requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus having a display device, the display device comprising:
a display panel, comprising:
a first substrate and a second substrate disposed opposite to the first substrate;
a display medium layer, disposed between the first substrate and the second substrate, the display medium layer comprising liquid crystal (LC) and polymers; and
a plurality of display units, comprising a first display unit having a first haze value and a second display unit having a second haze value; and
a light source, disposed adjacent to the display panel;
wherein a distance between the second display unit and the light source is greater than a distance between the first display unit and the light source, and the second haze value is greater than the first haze value.

2. The electronic apparatus according to claim 1, wherein a ratio of an area of the first display unit to an area of the second display unit is in a range from 0.9 to 1.1.

3. The electronic apparatus according to claim 1, wherein the first display unit has a first cell gap, the second display unit has a second cell gap, and the second cell gap is less than the first cell gap.

4. The electronic apparatus according to claim 1, wherein the first display unit is applied by a first voltage and the second display unit is applied by a second voltage for achieving a same gray level, wherein the second voltage is greater than the first voltage.

5. The electronic apparatus according to claim 1, wherein the display panel further comprises a color filter layer disposed between the first substrate and the second substrate.

6. The electronic apparatus according to claim 1, wherein the plurality of display units further comprises a third display unit having a third haze value, and a location of the third display unit is more central at the display panel than a location of the second display unit, wherein the third haze value is larger than the second haze value.

7. The electronic apparatus according to claim 6, wherein the third display unit and the second display unit are spaced apart from the light source at a same distance.

8. An electronic apparatus having a display device, the display device comprising:
a display panel, comprising:
a first substrate and a second substrate disposed opposite to the first substrate;
a display medium layer, disposed between the first substrate and the second substrate, the display medium layer comprising liquid crystal (LC) and polymers;
a plurality of display units, comprising a first display unit and a second display unit; and
a plurality of spacers disposed between the first substrate and the second substrate, the plurality of spacers comprising a first spacer disposed correspondingly to the first display unit and a second spacer disposed correspondingly to the second display unit, wherein a first horizontal level of the first spacer is greater than a second horizontal level of the second spacer; and
a light source, disposed adjacent to the display panel;
wherein a distance between the second display unit and the light source is greater than a distance between the first display unit and the light source, wherein the first display unit has a first lighting area, the second display unit has a second lighting area, and the second lighting area is greater than the first lighting area.

9. The electronic apparatus according to claim 8, wherein a ratio of an area of the first display unit to an area of the second display unit is in a range from 0.9 to 1.1.

10. The electronic apparatus according to claim 8, wherein the first display unit has a first haze value and the second display unit has a second haze value, and the second haze value is greater than the first haze value.

11. An electronic apparatus having a display device, the display device comprising:
a display panel, comprising:
a first substrate and a second substrate disposed opposite to the first substrate;
a display medium layer, disposed between the first substrate and the second substrate, the display medium layer comprising liquid crystal (LC) and polymers; and
a plurality of display units, comprising a first display unit and a second display unit; and
a light source, disposed adjacent to the display panel,
wherein a distance between the second display unit and the light source is greater than a distance between the first display unit and the light source, wherein the first display unit has a first lighting area, the second display unit has a second lighting area, and the second lighting area is greater than the first lighting area.

12. The electronic apparatus according to claim 11, wherein the first display unit and the second display unit respectively comprise a first electrode portion and a second electrode portion, wherein an area of the first electrode portion is less than an area of the second electrode portion.

13. The electronic apparatus according to claim 11, further comprising:
a first electrode layer disposed between the first substrate and the second substrate; and
a second electrode layer disposed between the first substrate and the second substrate,
wherein one of the first electrode layer and the second electrode layer is a patterned electrode layer, and the patterned electrode layer comprises:
a first electrode portion corresponding to the first display unit; and
a second electrode portion corresponding to the second display unit,
wherein an area of the first electrode portion is less than an area of the second electrode portion.

14. The electronic apparatus according to claim 11, further comprising a light shielding layer disposed on one of the first substrate and the second substrate, wherein the light shielding layer has a first shielding portion corresponding to the first display unit and a second shielding portion corresponding to the second display unit, wherein an area of the first shielding portion is greater than an area of the second shielding portion.

15. The electronic apparatus according to claim 14, wherein the first shielding portion has a first opening area and the second shielding portion has a second opening area, the first opening area is greater than the second opening area.

16. The electronic apparatus according to claim 11, wherein the second display unit and the first display unit are staggered at a direction perpendicular to the one side of the first substrate adjacent to the light source.

17. The electronic apparatus according to claim 11, wherein the plurality of display units are arranged into m rows, and one of the m rows comprises p display units having a same lighting area, wherein m and p are positive integers.

18. The electronic apparatus according to claim 17, wherein the p display units of a (m−1)-th row and the p display units of a m-th row are staggered to each other.

19. The electronic apparatus according to claim 17, wherein spacings between the p display units in the m rows decrease when distances between the p display units and the light source increase.

20. The electronic apparatus according to claim 11, wherein the first display unit has a first haze value, the second display unit has a second haze value, and a ratio of the first haze value to the second haze value is in a range from 0.9 to 1.1.

* * * * *